US006728677B1

United States Patent
Kannan et al.

(10) Patent No.: US 6,728,677 B1
(45) Date of Patent: Apr. 27, 2004

(54) METHOD AND SYSTEM FOR DYNAMICALLY IMPROVING PERFORMANCE OF SPEECH RECOGNITION OR OTHER SPEECH PROCESSING SYSTEMS

(75) Inventors: Ashvin Kannan, Sunnyvale, CA (US); Hy Murveit, Portola Valley, CA (US); Christopher Leggetter, Mountain View, CA (US); Michael Schuster, Palo Alto, CA (US)

(73) Assignee: Nuance Communications, Menlo Park, CA (US)

( * ) Notice: Subject to any disclaimer, the term of this patent is extended or adjusted under 35 U.S.C. 154(b) by 419 days.

(21) Appl. No.: 09/773,996

(22) Filed: Jan. 31, 2001

(51) Int. Cl.[7] .............................................. G10L 21/00
(52) U.S. Cl. .................................................... 704/270
(58) Field of Search .............................. 704/270, 275; 707/104; 379/242; 370/352

(56) References Cited

U.S. PATENT DOCUMENTS

| 6,119,087 A | * | 9/2000 | Kuhn et al. | 704/270 |
| 6,345,279 B1 | * | 2/2002 | Li et al. | 707/104 |
| 6,505,161 B1 | * | 1/2003 | Brems | 704/270 |
| 6,542,600 B1 | * | 4/2003 | Munson et al. | 379/242 |

OTHER PUBLICATIONS

Douglas A. Reynolds, Automatic Speaker Recognition Using Gaussian Mixture Speaker Models, vol. 8, No. 2, 1995, The Lincoln Laboratory Journal, Pp. 173–192.

* cited by examiner

Primary Examiner—Susan McFadden
(74) Attorney, Agent, or Firm—Blakely, Sokoloff, Taylor & Zafman LLP

(57) ABSTRACT

The present invention introduces a system and method for dynamically improving speech recognition in a speech recognition or other speech processing system. The method comprises dynamically adjusting the system, which comprises estimating the utilization of resources in the system; and improving the performance of the system according to the availability of resources.

60 Claims, 3 Drawing Sheets

METHOD AND SYSTEM FOR DYNAMICALLY IMPROVING PERFORMANCE OF SPEECH RECOGNITION OR OTHER SPEECH PROCESSING SYSTEMS

FIELD OF THE INVENTION

The present invention relates to the field of speech recognition or other speech processing fields such as speaker verification or text-to-speech processing. In particular the present invention discloses a system and method for dynamically improving the performance of speech recognition or other speech processing systems.

BACKGROUND OF THE INVENTION

Speech recognition systems are currently in use for responding to various forms of commerce via a telephone network. One example of such a system is utilized in conjunction with a stock brokerage. According to this system, a caller can provide their account number, obtain a quotation for the price of a particular stock issue, purchase or sell a particular number of shares at market price or a predetermined target price among other types of transactions. Natural language systems can also be used to respond to such things as requests for telephone directory assistance.

These types of speech recognition systems are typically deployed to handle a maximum call capacity for peak periods. This means that the hardware supporting the system provides enough memory, processing power and bandwidth to handle calls with a predetermined level of accuracy. For example, a company may deploy a speech recognition system that may handle 10,000 callers because at noon the company has that many calls. However, at all other times the system is not used to its full potential because only 5,000 callers are in the system.

Speech recognition systems typically are configurable, within limits, as to the amount of processing power, memory, network bandwidth, and other system resources that they may consume. Often, memory, speed, and accuracy can be traded off against each other. For instance, a particular configuration of one system may use less CPU resources than another, typically at the cost of lower average speech recognition accuracy. System configuration is often done ahead of time, resulting in a particular resource/performance tradeoff for the particular deployment.

SUMMARY OF THE INVENTION

The present invention introduces a system and method for dynamically improving speech recognition or other speech processing systems by estimating the utilization of resources in the system; and improving the performance of the system according to the availability of resources.

Other features of the present invention will be apparent from the accompanying drawings and from the detailed description which follows.

BRIEF DESCRIPTION OF THE DRAWINGS

The objects, features and advantages of the present invention will be apparent to one skilled in the art in view of the following detailed description in which.

DETAILED DESCRIPTION

A system and method for dynamically improving speech recognition in a speech recognition or other speech processing system such as a speaker verification system or a text-to-speech processing system is described. The method comprises dynamically adjusting the system, which comprises estimating the utilization of resources in the system; and improving the performance of the system according to the availability of resources.

The techniques described herein may be implemented using one or more general purpose computers selectively activated or configured by computer software stored in the computer or elsewhere. Such computer software may be stored in a computer readable storage medium, such as, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently constrained to any particular type of computer or other system. Various general purpose systems may be used with programs in accordance with the teachings herein, or it may prove convenient to construct more specialized system to perform the required method steps. The required structure for a variety of these systems will be apparent from the description below. In addition, any of a variety of programming languages may be used to implement the teachings of the techniques described herein.

Note that in this description, references to "one embodiment" or "an embodiment" mean that the feature being referred to is included in at least one embodiment of the present invention. Further, separate references to "one embodiment" in this description do not necessarily refer to the same embodiment, however, neither are such embodiments mutually exclusive, unless so stated and except as will be readily apparent to those skilled in the art.

Figure 1:
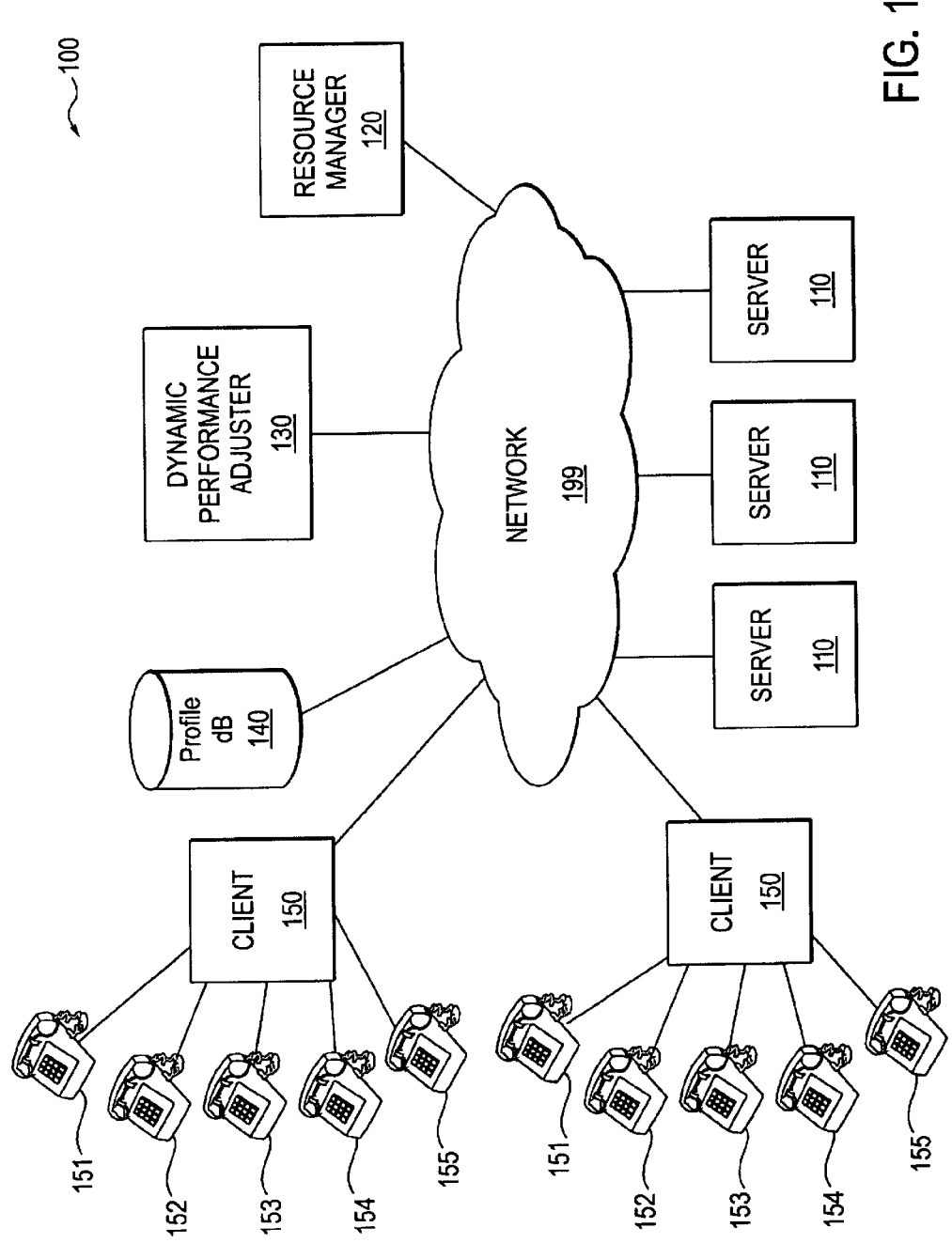
FIG. 1 is a high level block diagram of an exemplary speech recognition system according to one embodiment of the present invention.

The techniques and elements described herein may be included within a speech recognition system 100 such as that illustrated in FIG. 1. According to the embodiment depicted in FIG. 1, one or more servers 110 communicate to a plurality of clients 150. The clients 150 may transmit and receive data from servers 110 over a variety of communication media including (but not limited to) a local area network and/or a larger network 199 (e.g., the Internet). Other types of communication channels such as wireless communication via satellite broadcast (not shown) may additionally (or alternatively) be used.

Clients 150 service callers 151–155. Callers 151–155 may be analog or digital telephones, cellular phones or other similar device capable of transmitting and receiving voice. Servers 110 may include a database 140 for storing various types of data. This data may include, for example, specific caller data (e.g., caller account information and caller preferences) and/or more general data. The database 140 may also store information regarding the level of service a caller is entitled to receive. For instance, callers may be "Platinum" callers and have a higher level of service then "Gold" or "Silver" level callers. Database 140 may also include voice prints that are used to verify a caller's 151–155 identity. The database on servers 110 in one embodiment runs an instance of a Relational Database Management System (RDBMS), such as Microsoft™ SQL-Server, Oracle™ or the like.

A user/client may interact with and receive feedback from servers 110 using various different communication devices and/or protocols. According to one embodiment, a user connects to servers 110 via client software. The client software may include a browser application such as Netscape Navigator™ or Microsoft Internet Explorer™ on the user's personal computer which communicates to servers 110 via the Hypertext Transfer Protocol (hereinafter "HTTP"). In other embodiments, clients may communicate with servers 110 via pagers (e.g., in which the necessary transaction software is electronic in a microchip) or, hand-held computing devices.

System 100 also includes a dynamic performance adjuster 130. The adjuster 130 considers what resources are available in system 100 and increases the performance of system 100 until the resources are substantially exhausted. Resources may include CPU usage, memory usage, and bandwidth usage of servers 110, for example. If the system 100 has no available resources, then adjuster 130 may decrease the performance of system 100 to free-up resources and avoid system overload. In another embodiment, adjuster 130 does nothing when no resources are available.

Resource manager 120 is also connected to the network 199 and is included in system 100 to balance the load carried by each server 110. Thus, if callers 151–155 call into system 100 through client 150, resource manager 120 will distribute caller 151–155 such that the resources (CPU and memory) of servers 110 are equally balanced. The dynamic performance adjuster 130 requires information about resource utilization. Although the individual servers 110 may be aware of their own resource utilization, the resource manager 120 is useful because it is aware of resource utilization across all servers 110, and may also be tracking historical usage patterns. It may be able to provide the dynamic performance adjuster 130 with good estimates of current and future resource utilization. In one embodiment, the resource manager 120, may be of the type described in U.S. Pat. No. 6,119,087 to Kuhn, et al. entitled "System Architecture for and Method of Voice Processing" assigned to Nuance Communications of Menlo Park, Calif. and herein incorporated by reference.

Resource manager 120 is not included as part of system 100 in alternate embodiments of the invention.

An Exemplary Architecture

Figure 2:
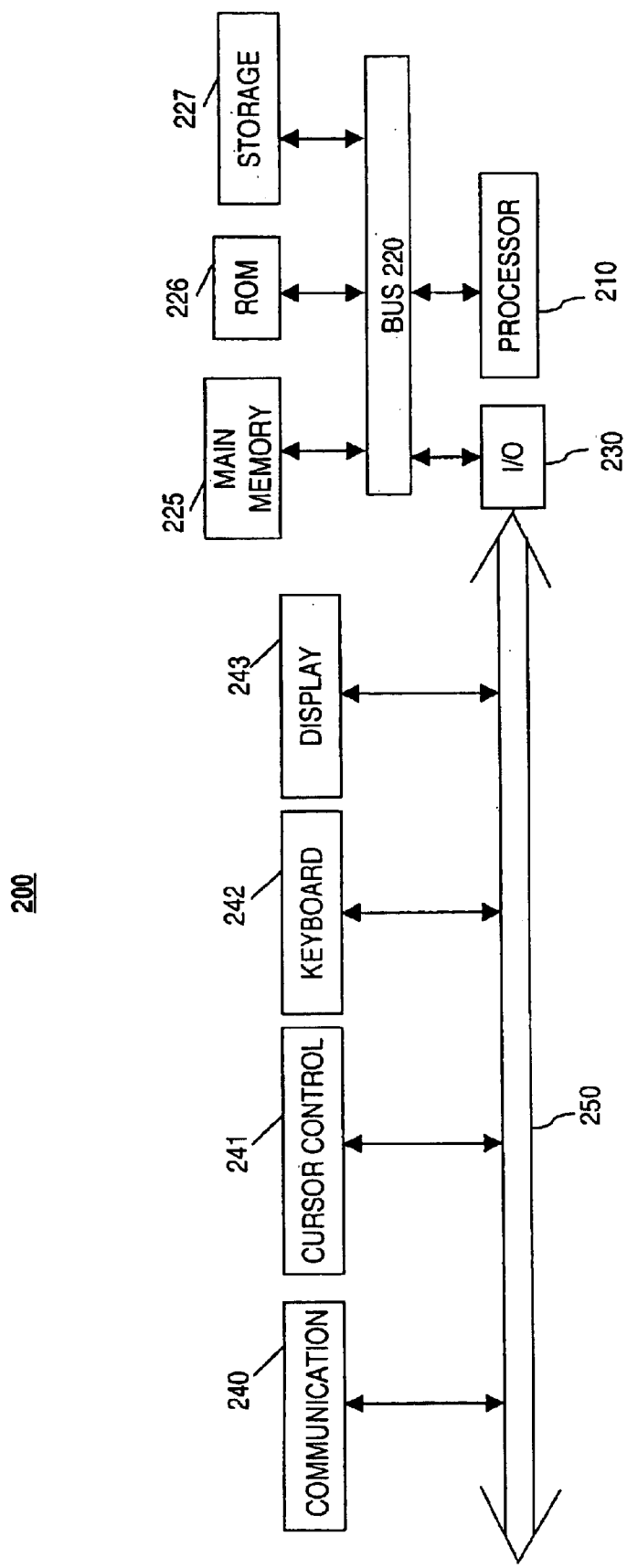
FIG. 2 is an exemplary block diagram of a computer architecture used to implement embodiments of the present invention.

Having briefly described an exemplary network architecture, which employs various elements of the present invention, a computer system 200 representing exemplary clients 150 servers (e.g., commerce servers 110), dynamic performance improvers 130, and/or resource manager 120 in which elements of the present invention may be implemented will now be described with reference to FIG. 2.

One embodiment of computer system 200 comprises a system bus 220 for communicating information, and a processor 210 coupled to bus 220 for processing information. Computer system 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Computer system 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Computer system 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). For example, video news clips and related information may be presented to the user on the display device 243.

The communication device 240 is for accessing other computers (servers or clients) via a network 199. The communication device 240 may comprise a modem, a network interface card, or other well known interface device, such as those used for coupling to Ethernet, token ring, or other types of networks.

It should be noted, however, that the described techniques are not limited to use in speech recognition systems, nor are they limited in application to speech signals or to any particular type of signal. In a speech recognition system such as the one shown in FIG. 1, multiple functions and tasks may be performed. System 100 may be used to verify a caller's identity and allow access to the system 100. Another application may include generating speech to be played out to callers 151–155, from some stored text representation (i.e. text-to-speech processing) or from other computer representations of what should be spoken to the caller. System 100 may be used for recognizing a caller, 151–155 verifying that a caller 155 is who they claim to be. Specific examples include, using voice responses to listen to credit and banking information, or voice activated, systems used by airlines and other transportation agencies, automated operator systems, etc.

Systems 100 may perform these tasks as follows. Caller 151 attempts to access system 100 via a telephone in order to obtain the caller's 151 checking account balance. Caller 151 may be prompted to submit an utterance for identification and verification purposes. For example, the caller 151 may be asked to say their name. That utterance will be recognized by system 100, and a database of permitted callers will be searched to determine if the caller's 151 name is valid. If caller 151's name is valid, the name may then be analyzed by a verifier. The verifier will determine whether caller 151 is truly caller 151 or an imposter. If the caller 151 has been recognized and verified, then caller 151 may access their checking account information.

In order for system 100 to be effective and useful, an adequate number of servers 110 should be available to handle the callers 151–155 at any given time. This is often referred to as quality of service. For example, if at a peak calling time 5,000 callers attempt to access system 100, system 100 must have an adequate number of servers 110 (resources) available to handle the call volume. Furthermore, more resources may be desired if system 100 is required to perform with near perfect accuracy at maximum speed. However, there are often periods of low call volume where the resources of system 100 are not all used.

Dynamic performance adjuster 130 continuously monitors system 100 for periods of low or very high system 100 resource usages. In low periods, adjuster 130 dynamically improves the performance of system 100 to maximize the use of available resources. For example, during peak call volume periods, system 100 may be configured to deliver a 5% error rate in accurately identifying a caller's utterance. However, during a low-call period adjuster 130 can utilize all system 100 resources to lower the error rate below 5%. In another embodiment, a 5% error may be for aggregate caller population. But a group within that population may have a 15% error rate. For example, a 15% error rate may be attributable to non-native speakers of the English language. Adjuster 130 may use available resources to lower that specific group's error rate below 15%, targeting the extra resource available to the utterances that can benefit most from those extra resources.

In yet another embodiment, once a caller has been identified, a level of service value stored in profile database 140 may indicate a level of service associated with the particular caller. Therefore, if the caller has a high level of service, more resources will be dedicated to that caller. This may be done whether or not there are extra resources available. The caller's level of service may be determined by many factors, including, for instance, if the caller has paid an extra subscription cost, if the caller is a frequent customer, or if the caller is more likely than average to purchase goods.

In another embodiment, improves 130 may improve recognition of utterances, verification of callers 151–155, as well as system latency. Latency involves how quickly system 100 responds to a caller 151–155 after an utterance is made. Thus system 100 may decrease the accuracy of the utterance recognition and verification, but in return provide increased system response.

There are many ways in which speech processing system 100 may adjust its parameters to consume more system resources in order to improve processing quality. Likewise system 100, may consume fewer system resources and, therefore, potentially reduce speech processing quality. In one embodiment system's 100 pruning beam width may be altered to increase or decrease the systems CPU usage. Pruning beam width is a well-known speech recognition technique to one of ordinary skill in the art. Speech recognition system 100 converts speech to a sequence of words. This sequence of words is one of many possible sequences permitted by the grammar used by the speech recognition system. Speech recognition system 100 may save CPU resources by removing from consideration some of the possible word sequences. Possible word sequences are removed early on in its processing of a given sentence, it processing at that point indicates that these sequences are less likely than others to be the final recognition result. When speech recognition system 100 discards a sequence, it may make a speech recognition error (here referred to as a pruning error) if the sequence discarded was the word sequence actually spoken by the caller. It is also a pruning error if that sequence would have ultimately been chosen by the system had it not been discarded. The number of sequences considered or discarded is affected by the pruning beam width. Increasing the width, results in more sequences considered, which results in more CPU usage, and accordingly, fewer potential errors. Conversely, reducing the beam width reduces the CPU usage, but may reduce the speech recognition accuracy of the system as well.

In another embodiment the dynamic adjuster 130 may use different processing strategies which differ in computational cost. Examples of this would be to change the acoustic models used for speech recognition to include models with more parameters, to include models adapted specifically to the current caller (caller 151–155), or different recognition algorithms.

Dynamic performance adjuster 130 may include a resource utilization estimator (RUE). RUE analyzes servers 110 to determine if they have any available resources. Available resource may be from available CPU usage, available memory and bandwidth. In addition RUE can analyze the bandwidth availability or constraints on network 199. RUE can analyze the network 199 on a per node basis.

In another embodiment RUE may be part of server 110, client 150 or resource manager 120. In one embodiment, resource manager 120 may be part of RUE. The functions of performance adjuster 130 may be isolated as shown in FIG. 1, or distributed throughout nodes of network 100.

Figure 3:
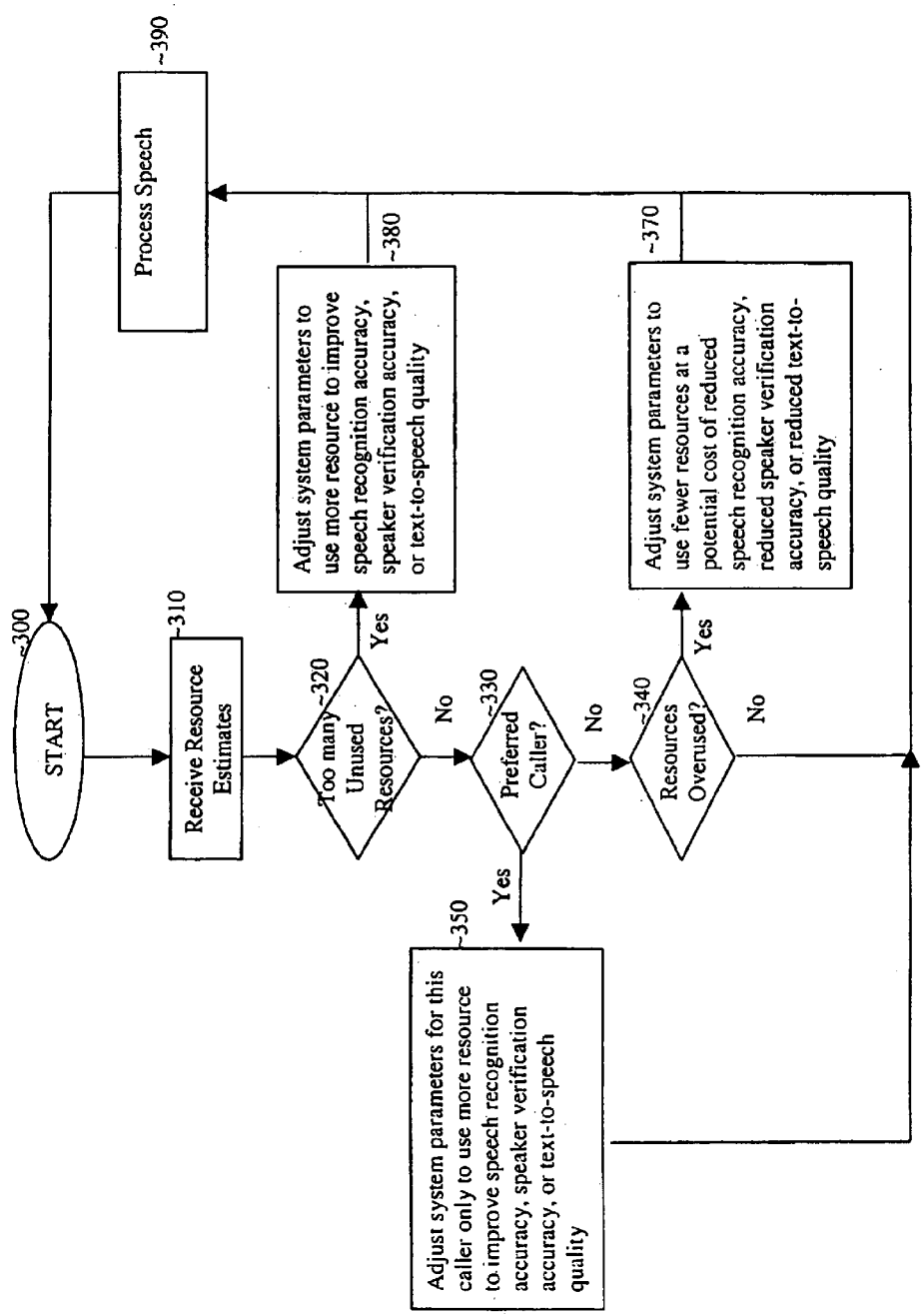
FIG. 3 shows an example of the processing flow of a speech recognition system according to one embodiment of the present invention.

FIG. 3 shows an example of the processing flow of a speech recognition system according to one embodiment of the present invention. The process commences at block 300. At processing block 310, dynamic performance adjuster 130 receives available resources from servers 110 and network 199.

At decision block 320, adjuster 130 determines if there are too many unused resources. A percentage of the resource used from the available pool may be the criteria used (e.g. if fewer than 75% of the resources are used). If there are too many unused resources then the flow continues to processing block 380 where system parameters are adjusted to use more resource, aimed at improving speech recognition accuracy, speaker verification accuracy, or text-to-speech quality. After the parameters are adjusted, the flow continues to processing block 390 where the server 110 serving a caller 151–155 processes speech (e.g. recognizes one utterance) and then flow passes back to start block 300. However, if too many resources were not unused in the test at decision At decision block 330, adjuster 130 determines if the caller 151–155 might be a preferred caller who is eligible for improved service. If the caller is a preferred caller, then flow passes on to processing block 350 where system parameters are temporarily adjusted for the current caller to use more resource, aimed at improving speech recognition accuracy, speaker verification accuracy, or text-to-speech quality for that caller only. After the parameters are adjusted, the flow continues to processing block 390 where the server 110 serving a caller 151–155 processes speech for that caller. Flow then passes back to start block 300. However, if the caller 151–155 is not a preferred caller, flow passes on to decision block 340.

At decision block 340, adjuster 130 determines if there are too few unused resources. A percentage of the resource used from the available pool may be the criteria used (e.g. if more than 90% of the resources are used). If there are too few unused resources, then the flow continues to processing block 370 where system parameters are adjusted to use fewer resources, aimed at preventing the system from excessive latency if its resources are overused. This can come at a cost of reduced speech recognition accuracy, reduced speaker verification accuracy, or reduced text-to-speech quality. After the parameters are adjusted, the flow continues to processing block 390 where the server 110 serving a caller 151–155 processes speech (e.g. recognizes one utterance) and then flow passes back to start block 300. However, an adequate amount of resource is still available, given the test at decision block 340, the flow passes on to start block 300. The percentages described above are provided In alternate embodiments, the combination of improvements may include fewer than that described above. In another embodiment the order of the improvements may be rearranged as well.

In another embodiment, system 100 may cooperate with an automatic speech recognition and verification software package, such as, Nuance 7 manufactured by Nuance Communications of Menlo Park, Calif.

The foregoing has described a system and method for dynamically improving the performance of a speech processing system. It is contemplated that changes and modifications may be made by one of ordinary skill in the art, to the materials and arrangements of elements of the present invention without departing from the scope of the invention.

We claim:

1. A method comprising:
   monitoring utilization of computing resources in a speech processing system; and
   based on said monitoring, dynamically improving performance of speech processing operations in the speech processing system by increasing utilization of the computing resources in the speech processing system in the absence of a need for greater utilization of the computing resources.

2. A method as recited in claim 1, wherein said dynamically improving performance of speech processing operations comprises dynamically increasing accuracy of speech processing operations.

3. A method as recited in claim 1, wherein said dynamically improving performance of speech processing operations comprises dynamically reducing latency of speech processing operations.

4. A method as recited in claim 1, wherein said dynamically improving performance of speech processing operations comprises dynamically improving performance of automatic speech recognition.

5. A method as recited in claim 4, wherein said dynamically improving performance of speech processing operations comprises dynamically increasing accuracy of speech recognition.

6. A method as recited in claim 4, wherein said dynamically improving performance of speech processing operations comprises dynamically reducing latency of speech recognition.

7. A method as recited in claim 1, wherein said dynamically improving performance of speech processing operations comprises dynamically improving performance of speaker authentication.

8. A method as recited in claim 7, wherein said dynamically improving performance of speech processing operations comprises dynamically increasing accuracy of speaker authentication.

9. A method as recited in claim 7, wherein said dynamically improving performance of speech processing operations comprises dynamically reducing latency of speaker authentication.

10. A method as recited in claim 1, wherein said dynamically improving performance of speech processing operations comprises dynamically improving performance of speaker identification.

11. A method as recited in claim 10, wherein said dynamically improving performance of speech processing operations comprises dynamically increasing accuracy of speaker identification.

12. A method as recited in claim 10, wherein said dynamically improving performance of speech processing operations comprises dynamically reducing latency of speaker identification.

13. A method comprising:
    monitoring utilization of computing resources in a speech processing system; and
    based on said monitoring, dynamically adjusting performance of speech processing operations in the speech processing system from a first adequate level of performance to a second adequate level of performance different from the first level, by dynamically adjusting utilization of the computing resources in the speech processing system.

14. A method as recited in claim 13, wherein said dynamically adjusting performance of speech processing operations in the speech processing system comprises dynamically degrading performance of speech processing operations in the speech processing system by dynamically reducing utilization computing of resources in the speech processing system.

15. A method as recited in claim 13, wherein said dynamically adjusting performance of speech processing operations in the speech processing system comprises dynamically improving performance of speech processing operations in the speech processing system by dynamically increasing utilization computing of resources in the speech processing system.

16. A method as recited in claim 13, wherein said dynamically adjusting performance of speech processing operations comprises dynamically adjusting accuracy of speech processing operations.

17. A method as recited in claim 13, wherein said dynamically adjusting performance of speech processing operations comprises dynamically adjusting latency of speech processing operations.

18. A method as recited in claim 13, wherein said dynamically adjusting performance of speech processing operations comprises dynamically adjusting performance of automatic speech recognition.

19. A method as recited in claim 18, wherein said dynamically adjusting performance of speech processing operations comprises dynamically adjusting accuracy of speech recognition.

20. A method as recited in claim 18, wherein said dynamically adjusting performance of speech processing operations comprises dynamically adjusting latency of speech recognition.

21. A method as recited in claim 13, wherein said dynamically adjusting performance of speech processing operations comprises dynamically adjusting performance of speaker authentication.

22. A method as recited in claim 21, wherein said dynamically adjusting performance of speech processing operations comprises dynamically adjusting accuracy of speaker authentication.

23. A method as recited in claim 21, wherein said dynamically adjusting performance of speech processing operations comprises dynamically adjusting latency of speaker authentication.

24. A method as recited in claim 13, wherein said dynamically adjusting performance of speech processing operations comprises dynamically adjusting performance of speaker identification.

25. A method as recited in claim 24, wherein said dynamically adjusting performance of speech processing operations comprises dynamically adjusting accuracy of speaker identification.

26. A method as recited in claim 24, wherein said dynamically adjusting performance of speech processing operations comprises dynamically adjusting latency of speaker identification.

27. A method comprising:
    receiving at a speech processing system a signal representing speech from an end user device;
    using a speech recognition system in the speech processing system to automatically recognize the speech;
    monitoring utilization of computing resources in the speech processing system; and based on said monitoring, dynamically improving performance of speech recognition by the speech recognition system from a first level of performance to a second level of performance, by dynamically adjusting utilization of the computing resources in the speech processing system.

28. A method as recited in claim 27, wherein the first level of performance is an adequate level of performance, and wherein said dynamically improving performance of the speech recognition system is done in the absence of a need for greater utilization of computing resources for speech recognition.

29. A method as recited in claim 27, wherein said dynamically improving performance of speech recognition comprises dynamically increasing accuracy of speech recognition.

30. A method as recited in claim 27, wherein said dynamically improving performance of speech recognition comprises dynamically reducing latency of speech recognition.

31. A method comprising:
receiving at a speech processing system a signal representing speech of a speaker;
using a speaker authentication system in the speech processing system to automatically authenticate the speaker;
monitoring utilization of computing resources in the speech processing system; and
based on said monitoring, dynamically improving performance of speaker authentication by the speaker authentication system from a first level of performance to a second level of performance, by dynamically adjusting utilization of the computing resources in the speech processing system.

32. A method as recited in claim 31, wherein the first level of performance is an adequate level of performance, and wherein said dynamically improving performance of speaker authentication is done in the absence of a need for greater utilization of computing resources for speaker authentication.

33. A method as recited in claim 31, wherein said dynamically improving performance of speaker authentication comprises dynamically increasing accuracy of speaker authentication.

34. A method as recited in claim 31, wherein said dynamically improving performance of speaker authentication comprises dynamically reducing latency of speaker authentication.

35. A processing system comprising:
means for monitoring utilization of computing resources in a speech processing system; and
means for dynamically improving performance of speech processing operations in the speech processing system based on said monitoring, by increasing utilization of the computing resources in the speech processing system in the absence of a need for greater utilization of the computing resources.

36. A processing system as recited in claim 35, wherein said means for dynamically improving performance of speech processing operations comprises means for dynamically increasing accuracy of speech processing operations.

37. A processing system as recited in claim 35, wherein said means for dynamically improving performance of speech processing operations comprises means for dynamically reducing latency of speech processing operations.

38. A processing system as recited in claim 35, wherein said means for dynamically improving performance of speech processing operations comprises means for dynamically improving performance of automatic speech recognition.

39. A processing system as recited in claim 38, wherein said dynamically improving performance of speech processing operations comprises dynamically increasing accuracy of speech recognition.

40. A processing system as recited in claim 38, wherein said means for dynamically improving performance of speech processing operations comprises means for dynamically reducing latency of speech recognition.

41. A processing system as recited in claim 35, wherein said means for dynamically improving performance of speech processing operations comprises means for dynamically improving performance of speaker authentication.

42. A processing system as recited in claim 41, wherein said dynamically improving performance of speaker authentication comprises dynamically increasing accuracy of speaker authentication.

43. A processing system as recited in claim 41, wherein said dynamically improving performance of speaker authentication comprises dynamically reducing latency of speaker authentication.

44. A processing system as recited in claim 35, wherein said means for dynamically improving performance of speech processing operations comprises means for dynamically improving performance of speaker identification.

45. A processing system as recited in claim 44, wherein said dynamically improving performance of speaker identification comprises dynamically increasing accuracy of speaker identification.

46. A processing system as recited in claim 44, wherein said dynamically improving performance of speaker identification comprises dynamically reducing latency of speaker identification.

47. A processing system comprising:
a processor; and
a memory storing instructions which, when executed by the processor, cause the processing system to perform a process that comprises
monitoring utilization of computing resources in the processing system; and
based on said monitoring, dynamically adjusting performance of speech processing operations in the processing system from a first adequate level of performance to a second adequate level of performance different from the first level, by dynamically adjusting utilization of the computing resources in the speech processing system.

48. A processing system as recited in claim 47, wherein said dynamically adjusting performance of speech processing operations in the speech processing system comprises dynamically degrading performance of speech processing operations in the speech processing system by dynamically reducing utilization computing of resources in the speech processing system.

49. A processing system as recited in claim 47, wherein said dynamically adjusting performance of speech processing operations in the speech processing system comprises dynamically improving performance of speech processing operations in the speech processing system by dynamically increasing utilization computing of resources in the speech processing system.

50. A processing system as recited in claim 47, wherein said dynamically adjusting performance of speech processing operations comprises dynamically adjusting accuracy of speech processing operations.

51. A processing system as recited in claim 47, wherein said dynamically adjusting performance of speech processing operations comprises dynamically adjusting latency of speech processing operations.

52. A processing system as recited in claim 47, wherein said dynamically adjusting performance of speech processing operations comprises dynamically adjusting performance of automatic speech recognition.

53. A processing system as recited in claim 52, wherein said dynamically adjusting performance of speech processing operations comprises dynamically adjusting accuracy of speech recognition.

54. A processing system as recited in claim 52, wherein said dynamically adjusting performance of speech processing operations comprises dynamically adjusting latency of speech recognition.

55. A processing system as recited in claim 47, wherein said dynamically adjusting performance of speech processing operations comprises dynamically adjusting performance of speaker authentication.

56. A processing system as recited in claim 55, wherein said dynamically adjusting performance of speech processing operations comprises dynamically adjusting accuracy of speaker authentication.

57. A processing system as recited in claim 55, wherein said dynamically adjusting performance of speech processing operations comprises dynamically adjusting latency of speaker authentication.

58. A processing system as recited in claim 47, wherein said dynamically adjusting performance of speech processing operations comprises dynamically adjusting performance of speaker identification.

59. A processing system as recited in claim 58, wherein said dynamically adjusting performance of speech processing operations comprises dynamically adjusting accuracy of speaker identification.

60. A processing system as recited in claim 58, wherein said dynamically adjusting performance of speech processing operations comprises dynamically adjusting latency of speaker identification.

* * * * *